(12) United States Patent
Koike et al.

(10) Patent No.: US 8,498,083 B2
(45) Date of Patent: Jul. 30, 2013

(54) MAGNETO-RESISTIVE EFFECT ELEMENT HAVING SPACER LAYER CONTAINING GALLIUM OXIDE, PARTIALLY OXIDIZED COPPER

(75) Inventors: Hayato Koike, Tokyo (JP); Tsutomu Chou, Tokyo (JP); Yoshihiro Tsuchiya, Tokyo (JP); Hironobu Matsuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 220 days.

(21) Appl. No.: 13/049,195

(22) Filed: Mar. 16, 2011

(65) Prior Publication Data

US 2012/0237796 A1    Sep. 20, 2012

(51) Int. Cl.
*G11B 5/39* (2006.01)

(52) U.S. Cl.
USPC ...................................................... 360/324.1

(58) Field of Classification Search
USPC ...................................................... 360/324.1
See application file for complete search history.

(56) References Cited

U.S. PATENT DOCUMENTS

| | | | |
|---|---|---|---|
| 6,205,008 | B1 | 3/2001 | Gijs et al. |
| 6,359,289 | B1 | 3/2002 | Parkin |
| 7,672,085 | B2 * | 3/2010 | Hara et al. ............... 360/324 |
| 2001/0012186 | A1 | 8/2001 | Sakakima et al. |
| 2008/0062557 | A1 | 3/2008 | Tsuchiya et al. |
| 2008/0100968 | A1 | 5/2008 | Shimazawa et al. |
| 2008/0106827 | A1 | 5/2008 | Shimazawa et al. |
| 2008/0117554 | A1 | 5/2008 | Hara et al. |
| 2008/0170336 | A1 | 7/2008 | Tsuchiya et al. |
| 2009/0002893 | A1 | 1/2009 | Tsuchiya et al. |
| 2010/0039734 | A1 | 2/2010 | Hara et al. |

FOREIGN PATENT DOCUMENTS

| | | |
|---|---|---|
| JP | 08-504303 A | 5/1996 |
| JP | 2003-086863 A | 3/2003 |
| JP | 2008-112880 A | 5/2008 |
| JP | 2010-44848 A | 2/2010 |

OTHER PUBLICATIONS

Office Action mailed Mar. 26, 2013 in corresponding JP patent application No. 2011-276757 (English translation only).

* cited by examiner

*Primary Examiner* — Mark Blouin
(74) *Attorney, Agent, or Firm* — Posz Law Group, PLC

(57) ABSTRACT

A magneto-resistive effect (MR) element includes first and second magnetic layers where a relative angle formed by magnetization directions changes in response to an external magnetic field and a spacer layer positioned between the first magnetic layer and the second magnetic layer. The first magnetic layer is positioned closer to a substrate above which the MR element is formed than the second magnetic layer. The spacer layer includes a main spacer layer that is composed of gallium oxide as a primary component and a bottom layer that is positioned between the main spacer layer and the first magnetic layer and that is composed of partially oxidized copper as a primary component.

9 Claims, 7 Drawing Sheets

⊗ Magnetization Direction: from front side to back side of the sheet
◉ Magnetization Direction: from back side to front side of the sheet

MAGNETO-RESISTIVE EFFECT ELEMENT HAVING SPACER LAYER CONTAINING GALLIUM OXIDE, PARTIALLY OXIDIZED COPPER

BACKGROUND OF THE INVENTION

1. Field of the Invention

The present invention relates to a magneto-resistive effect (MR) element and particularly to a configuration of a spacer layer.

2. Description of the Related Art

Reproducing heads with high sensitivity and high output are in demand in conjunction with condensing of high recording density in hard disk drives (HDD). As an example of this type of reproducing head, a spin valve head has been developed. A spin valve head includes a nonmagnetic metal layer and a pair of ferromagnetic layers positioned on both sides of the nonmagnetic metal layer in a manner of contacting the nonmagnetic metal layer. The magnetization direction of one of the ferromagnetic layers is pinned in one direction (hereinafter, this type of layer is referred to as a magnetization pinned layer), and the magnetization direction of the other freely rotates in response to an external magnetic field (hereinafter, this type of layer is referred to as a magnetization free layer). When an external magnetic field is applied, the relative angle of the spins between the magnetization pinned layer and the magnetization free layer changes so that magneto-resistive change is realized. Typically, the magnetization direction of the magnetization pinned layer is pinned by utilizing the exchange coupling force of an anti-ferromagnetic layer.

On the other hand, in order to realize further condensing of high recording density, reducing a read gap (a distance between upper and lower shield layers) is required. However, when the read gap is reduced to approximately 20 nm, it is difficult to place an anti-ferromagnetic layer within the read gap. Therefore, a configuration has been developed in which a pair of magnetization free layers is arranged on both sides of a spacer layer. According to this configuration, reduction of the read gap is easily realized because no anti-ferromagnetic layer is required.

In either configuration, the spacer layer is a necessary component to realize a magneto-resistive change, and promising spacer layer materials have been developed to achieve a large magnetoresistance ratio (hereinafter referred to as MR ratio). Conventionally, a technology has been known that an MR ratio is increased by disposing a resistance adjustment layer in a spacer layer and narrowing a path where a sense current flows. However, because a sense current is concentrated to a conductive part so that a current density is increased, this technology is not preferable from the view point of reliability. U.S. Patent Application Publication No. 2008/0062557 discloses a technology that an oxide semiconductor layer such as ZnO, TiO or the like is used as a part of a spacer layer. Because this technology allows to prevent a sense current from being concentrated, it is possible to increase the reliability as increasing the MR ratio.

A ferromagnetic layer adjacent to the spacer layer is normally composed of Co, Ni, Fe or the like as a primary component. When these elements are positioned in a manner of contacting the oxide semiconductor layer, the ferromagnetic layer is oxidized due to an oxidization action of oxygen contained in the oxide semiconductor layer, polarizability is decreased, and therefore there is a possibility for the MR ratio to fall. U.S. Patent Application Publication No. 2008/0062557 discloses a technology that a nonmagnetic metal layer composed of copper, gold, silver or the like is disposed between a ferromagnetic layer composed of CoFe or the like and an oxide semiconductor layer. It is expected that these nonmagnetic metal layers prevent expansion of oxygen contained in the oxide semiconductor and oxidization of the ferromagnetic layer; however, a certain film thickness is required to function as an antioxidant film. On the other hand, when the film thickness is too large, an antioxidant effect can be obtained but electrons are more likely to be scattered, so that the MR ratio is decreased. For these reasons, it is difficult to maintain a balance between two demands that are the antioxidant and the prevention of electron scattering.

It is an object of the present invention to provide an MR element with which oxidization of a magnetic layer adjacent to a spacer layer is prevented and a large MR ratio is realized.

SUMMARY OF THE INVENTION

A magneto-resistive effect (MR) element of the present invention includes first and second magnetic layers where a relative angle formed by magnetization directions changes in response to an external magnetic field and a spacer layer positioned between the first magnetic layer and the second magnetic layer. The first magnetic layer is positioned closer to a substrate above which the MR element is formed than the second magnetic layer. The spacer layer includes a main spacer layer that is composed of gallium oxide as a primary component and a bottom layer that is positioned between the main spacer layer and the first magnetic layer and that is composed of partially oxidized copper as a primary component.

Compared to a conventional spacer layer formed of a metal layer such as copper or the like, the spacer layer including the main spacer layer composed of gallium oxide as a main component can realize a large MR ratio. Gallium oxide normally exists in an amorphous state when gallium oxide is in a thin film state; however, there are advantages in that wide band gap can be maintained even in the amorphous state and in that no lattice matching (matching of lattice constants of two adjacent materials) between the spacer layer and an adjacent magnetic layer is required.

On the other hand, as described above, a magnetic layer adjacent to the spacer layer is normally composed of Co, Ni, Fe or the like as a primary component. Accordingly, when these elements are positioned in a manner of contacting gallium oxide, the magnetic layer is oxidized due to an oxidization action of oxygen contained in gallium oxide, and therefore there is a possibility for the MR ratio to decrease. Specifically, gallium oxide oxidizes elements configuring the first magnetic layer by oxygen contained therein diffusing, the polarizability is decreased, and therefore there is a possibility to decrease the MR ratio.

Accordingly, in the present invention, the spacer layer is provided with a bottom layer composed of partially oxidized copper as a primary component. Copper has an effect that prevents diffusion of oxygen contained in gallium oxide. Also, in oxidized copper compared to unoxidized copper, electron scattering is less likely to occur. By disposing such a bottom layer, the antioxidation effect of copper can be maintained, the electron scattering can be suppressed, and an MR ratio can be increased.

The above description, as well as other objects, features, and advantages of the present specification will be evident by the detailed description that follows below with reference to the attached drawings exemplifying the present specification.

DETAILED DESCRIPTION OF THE INVENTION

An MR element according to embodiments of the present invention and several embodiments of a thin film magnetic head using the MR element are explained utilizing the drawings.

First Embodiment

Figure 1:
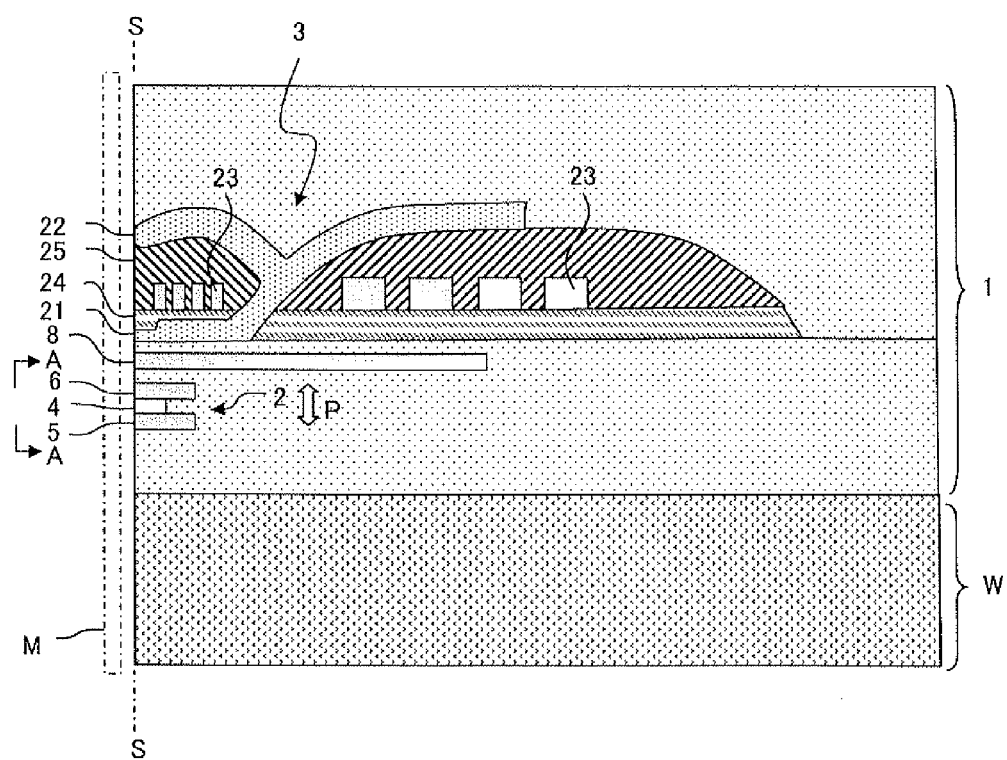
FIG. 1 is a main part cross-sectional view of a thin film magnetic head according to a first embodiment.
Figure 2:
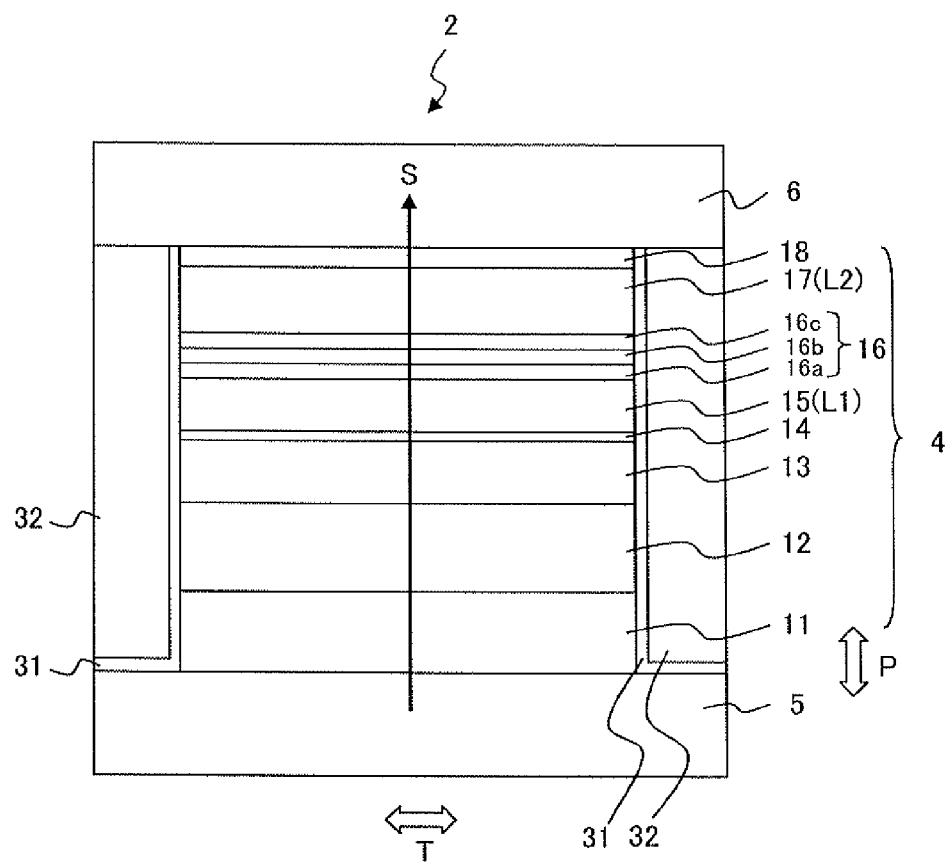
FIG. 2 is a side view of an MR element, as viewed from the A-A direction of FIG. 1, i.e., an air bearing surface.

FIG. 1 illustrates a main part cross-sectional view of a thin film magnetic head 1 according to a first embodiment. The thin film magnetic head 1 is formed on a substrate W and includes a reproducing head 2 and a recording head 3. FIG. 2 is a side view of the reproducing head 2 as viewed from the A-A direction of FIG. 1 and illustrates a layer configuration of the reproducing head 2 on the air bearing surface S. The air bearing surface S is a surface of the thin film magnetic head 1 that faces a recording medium M. First, a description is given regarding a configuration of the reproducing head 2 with reference to FIG. 2.

The reproducing head 2 includes a spin valve type MR element 4, upper and lower shield layers 6 and 5 disposed in a manner of sandwiching the MR element 4 in a film surface orthogonal direction (lamination direction) P, and bias magnetic field application layers 32 disposed on both sides in the track width direction T (sheet surface orthogonal direction in FIG. 1) of the MR element 4. A tip end part of the MR element 4, as illustrated in FIG. 1, is arranged on the air bearing surface S. The MR element 4 is arranged such that a sense current S flows in a film surface orthogonal direction P by voltage applied between the upper shield layer 6 and the lower shield layer 5. A magnetic field from the recording medium M positioned facing the MR element 4 changes as the recording medium M rotates. The magnetic field change is detected as an electrical resistance change of a sense current S based on the magneto-resistive effect. The MR element 4 reads magnetic information written in the recording medium M utilizing this principle.

Table 1 illustrates one example of a layer configuration of the MR element 4. Table 1 describes the lower shield layer 5 through the upper shield layer 6 from bottom to up in the lamination order.

TABLE 1

| Layer Configuration | | | Material | Film Thickness (nm) |
|---|---|---|---|---|
| Upper Shield Layer 6 | | | NiFe | 2000 |
| MR Element 4 | Protective Layer 18 | | Ru | 2.0 |
| | Magnetization Free Layer 17 (Second Magnetic Layer L2) | | CoFe | 4.0 |
| | Spacer Layer 16 | Nonmagnetic Layer 16c | Zn or Cu | 0.4 |
| | | Main Spacer Layer 16b | GaOx | 0.9 |
| | | Bottom Layer 16a | Partially Oxidized Cu | 0.6 |
| | Inner Magnetization Pinned Layer 15 (First Magnetic Layer L1) | | CoFe | 4.0 |
| | Exchange Coupling Transmitting Layer 14 | | Ru | 0.8 |
| | Outer Magnetization Pinned Layer 13 | | CoFe | 3.0 |
| | Anti-Ferromagnetic Layer 12 | | IrMn | 5.0 |
| | Under Layer 11 | | NiCr | 4.0 |
| Lower Shield Layer 5 | | | NiFe | 2000 |

The MR element 4 has a layer configuration in which the following are laminated above the lower shield layer 5 formed with an NiFe layer in this order: an under layer 11, an anti-ferromagnetic layer 12, an outer magnetization pinned layer 13, an exchange coupling transmitting layer 14, an inner magnetization pinned layer 15 (first magnetic layer L1), a spacer layer 16, a magnetization free layer 17 (second magnetic layer L2), and a protective layer 18. The protective layer 18 is covered by the upper shield layer 6 formed with an NiFe layer.

The under layer 11 is disposed in order to obtain a favorable exchange coupling between the outer magnetization pinned layer 13 and the anti-ferromagnetic layer 12 laminated above the under layer 11. The outer magnetization pinned layer 13 is exchange coupled with the anti-ferromagnetic layer 12 composed of IrMn. The outer magnetization pinned layer 13 is exchange coupled with the inner magnetization pinned layer 15 with the exchange coupling transmitting layer 14, which is composed of Ru, therebetween. As a result, the magnetization direction of the inner magnetization pinned layer 15 is firmly pinned. It is desirable that the inner magnetization pinned layer 15 is magnetized in a direction orthogonal to the air bearing surface S within its film plane. Because the magnetization directions of the inner magnetization pinned layer 15 and the outer magnetization pinned layer 13 are pinned in mutually antiparallel orientations, and the overall magnetization of these combined areas is suppressed. The magnetization free layer 17 of which the magnetization direction changes according to an external magnetic field is disposed above the inner magnetization pinned layer 15 in a manner of sandwiching the spacer layer 16. The protective layer 18 is disposed to prevent the deterioration of each laminated layer. The outer and inner magnetization pinned layers 13 and 15 as well as the magnetization free layer 17 are typically composed of CoFe, but may also contain Ni.

The bias magnetic field application layers 32 are formed on both sides of the MR element 4 in the track width direction T with insulating films 31 therebetween. The bias magnetic field application layers 32 are magnetic domain control films that convert the magnetization free layer 17 to a single magnetic domain, and apply a bias magnetic field to the magnetization free layer 17 in the track width direction T. The insulating layers 31 are composed of $Al_2O_3$, and the bias magnetic field application layers 32 are composed of CoPt, CoCrPt or the like.

The sense current S flows in the MR element 4 in the film surface orthogonal direction P. The sense current S is supplied from the upper and lower shield layers 6 and 5 which also function as electrodes. The magnetization direction of the magnetization free layer 17 is controlled in the track width direction T, i.e., in the direction orthogonal to the magnetization direction of the inner magnetization pinned layer 15, by the bias magnetic field from the bias magnetic field application layers 32 when no external magnetic field is applied. When an external magnetic field from the recording medium M is applied to the magnetization free layer 17, the magnetization direction of the magnetization free layer 17 rotates by a predetermined angle in the predetermined direction within the film plane according to the direction and strength of the external magnetic field. The magnetization direction of the magnetization free layer 17 forms a relative angle with the magnetization direction of the inner magnetization pinned layer 15 according to the direction and strength of an external magnetic field, and the spin dependent scattering of conductive electrons changes according to the relative angle, thereby a magneto-resistive change is generated. The MR element 4 detects this magneto-resistive change and reads the magnetic information of the recording medium M.

The position of the magnetization free layer 17 and the outer and inner magnetization pinned layers 13 and 15 may be disposed in vertically reverse order with respect to the spacer layer 16. In other words, the magnetization free layer 17 may be positioned closer to the substrate W than the outer and inner magnetization pinned layers 13 and 15. Specifically, the layers from the inner magnetization pinned layer 15 to the anti-ferromagnetic layer 12 are arranged between the protective layer 18 and the spacer layer 16 (arranged so that the inner magnetization pinned layer 15 is at the bottommost side and the anti-ferromagnetic layer 12 is at the top-most side), and the magnetization free layer 17 is arranged between the under layer 11 and the spacer layer 16.

In the present specification, in terms of the magnetization free layer 17 and the inner magnetization pinned layer 15, the layer positioned closer to the substrate W above which the MR element 4 is formed, i.e., beneath the spacer layer 16 as viewed in the lamination direction, is referred to as the first magnetic layer L1, and the layer positioned farther from the first magnetic layer L1 as viewed from the substrate W, i.e., above the spacer layer 16 as viewed in the lamination direction, is referred to as the second magnetic layer L2. In the layer configuration illustrated in Table 1, the inner magnetization pinned layer 15 is the first magnetic layer L1, and the magnetization free layer 17 is the second magnetic layer L2, and in the layer configuration with the reversed positional relation, the magnetization free layer 17 is the first magnetic layer L1, and the inner magnetization pinned layer 15 is the second magnetic layer L2.

The spacer layer 16 includes a main spacer layer 16b composed of gallium oxide as a primary component. The main spacer layer 16b may contain additives other than gallium oxide. The additives are, for example, metal oxides. Also, the mole fraction of gallium oxide in the main spacer layer 16b is preferably 50% or more. The composition of gallium oxide is expressed by the general formula GaOx where the range of x is $1.45 \leq x \leq 1.55$. The main spacer layer 16b is normally formed in an amorphous state. Gallium oxide has a larger resistance value and also a larger resistance change compared to Cu that has been used in a conventional spacer layer. Therefore, a larger MR ratio is obtained compared to the conventional MR element in which Cu is used as a spacer layer.

Gallium oxide is a promising material for realizing a high MR ratio. However, because containing oxygen, when the first and second magnetic layers L1 and L2 are adjacent to the main spacer layer 16b, gallium oxide tends to oxidize elements such as Fe, Co, Ni or the like, particularly Fe, contained in the first and second magnetic layers L1 and L2. When these elements are oxidized, the MR ratio tends to fall.

Therefore, for the purpose of an avoiding direct contact between the main spacer layer 16b and the first magnetic layer L1 to effectively prevent oxidation of the first magnetic layer L1, the spacer layer 16 includes a bottom layer 16a positioned between the main spacer layer 16b and the first magnetic layer L1. The bottom layer 16a is composed of a partially oxidized Cu as a primary component, and is positioned in a manner of contacting both the main spacer layer 16b and the first magnetic layer L1. The bottom layer 16a may contain additives other than Cu; however, the mole fraction of partially oxidized Cu in the bottom layer 16a is preferably 50% or more.

For the same purpose, the spacer layer 16 includes a nonmagnetic layer 16c composed of copper or zinc positioned between the main spacer layer 16b and the second magnetic layer L2 in contact with both. The nonmagnetic layer 16c can prevent oxidation of the second magnetic layer L2. The nonmagnetic layer 16c is preferably composed of substantially copper or zinc, and may contain a few amounts of additives. The nonmagnetic layer 16c may be partially oxidized. Namely, the nonmagnetic layer 16c may be substantially composed of copper or zinc, and oxygen.

As described above, the bottom layer 16a is composed of partially oxidized Cu. In other words, the bottom layer 16a is composed of a mixture of Cu, which is a metal, and an oxide of Cu as a primary component. Because electrons are more likely to scatter in Cu in a metal state, the MR ratio is decreased due to the electron scattering when the bottom layer 16a is composed only of Cu in a metal state as a primary component. Because the electron scattering is less likely to occur in an oxide of Cu compared to Cu in a metal state, the electron scattering in the bottom layer 16a is less likely to occur when the oxide of Cu is contained in the bottom layer 16a. The oxidation of the first magnetic layer L1 is mainly prevented by unoxidized Cu in a metal state, the electron scattering that is more likely to occur in Cu in a metal state is prevented by the oxide of Cu, and therefore both the oxidation of the first magnetic layer L1 and the electron scattering can be suppressed.

In order to enhance the antioxidation effect of the first magnetic layer L1, it is preferred that the ratio of an atomic fraction of oxidized Cu in the bottom layer 16a becomes smaller as being closer to the first magnetic layer L1, and it is further preferred that a portion of the bottom layer 16a that is adjacent to the first magnetic layer L1 contains only unoxidized Cu in a metal state. In the present embodiment, in order to form the bottom layer 16a, a Cu film in a metal state is formed, and then a plasma oxidation treatment is performed so as to partially oxidize the Cu film. Thereby, an upper portion of the Cu film becomes more likely to be oxidized, a lower portion of the Cu film becomes less likely to be oxidized, and such a Cu distribution can be easily obtained.

Cu can exist in a monovalent oxidation state ($Cu_2O$) and in a divalent oxidation state (CuO). An electron scattering is less likely to occur in $Cu_2O$ because $Cu_2O$ is an oxide. In contrast, since the oxygen ratio of $Cu_2O$ is low compared to CuO, even when oxygen coupling to Cu separates from Cu and oxidizes the first magnetic layer L1, the amount to be oxidized is limited. From these reasons, it is preferred that a Cu oxide of the bottom layer 16a contains $Cu_2O$. It is preferred that the atomic fraction of $Cu_2O$ is higher than that of CuO, and also it is further preferred that a Cu oxide of the bottom layer 16a is substantially configured of $Cu_2O$. The ratio between $Cu_2O$ and CuO can be adjusted by properly selecting a treatment condition (such as treatment duration or the like) of a plasma oxidation treatment.

Referencing FIG. 1 again, the recording head 3 is disposed above the reproducing head 2 with an interelement shield layer 8 formed therebetween by a sputtering or the like. The recording head 3 has a configuration for so-called perpendicular magnetic recording. A magnetic pole layer for writing is formed with a main magnetic pole layer 21 and an auxiliary magnetic pole layer 22. These magnetic pole layers are formed by a frame plating method or the like. The main magnetic pole layer 21 is formed of FeCo and is arranged in an orientation nearly orthogonal to the air bearing surface S on the air bearing surface S. A coil layer 23 extending over a gap layer 24 composed of an insulating material is wound around the periphery of the main magnetic pole layer 21 so that a magnetic flux is induced to the main magnetic pole layer 21 by the coil layer 23. The coil layer 23 is formed by a frame plating method or the like. The magnetic flux is guided within the main magnetic pole layer 21 and is emitted from the air bearing surface S towards the recording medium M. The main magnetic pole layer 21 is tapered not only in the film surface orthogonal direction P but also in the track width direction T near the air bearing surface S to generate a minute and strong write magnetic field in accordance with high recording density.

The auxiliary magnetic pole layer 22 is a magnetic layer magnetically coupled with the main magnetic pole layer 21. The auxiliary magnetic pole layer 22 is a magnetic pole layer, having a film thickness between approximately 0.01 μm and approximately 0.5 μm, formed of an alloy composed of two or three of any of Ni, Fe, Co or the like. The auxiliary magnetic pole layer 22 is disposed in a manner of branching from the main magnetic pole layer 21 and faces the main magnetic pole layer 21 with the gap layer 24 and a coil insulating layer 25 therebetween on the air bearing surface S side. The end part of the auxiliary magnetic pole layer 22 on the air bearing surface S side forms a trailing shield part where the layer cross-section is larger than other parts of the auxiliary magnetic pole layer 22. The magnetic field gradient between the auxiliary magnetic pole layer 22 and the main magnetic pole layer 21 becomes steeper in the vicinity of the air bearing surface S by disposing this type of auxiliary magnetic pole layer 22. As a result, the signal output jitter is reduced, and the error rate during reading can be lowered.

Second Embodiment

Figure 3:
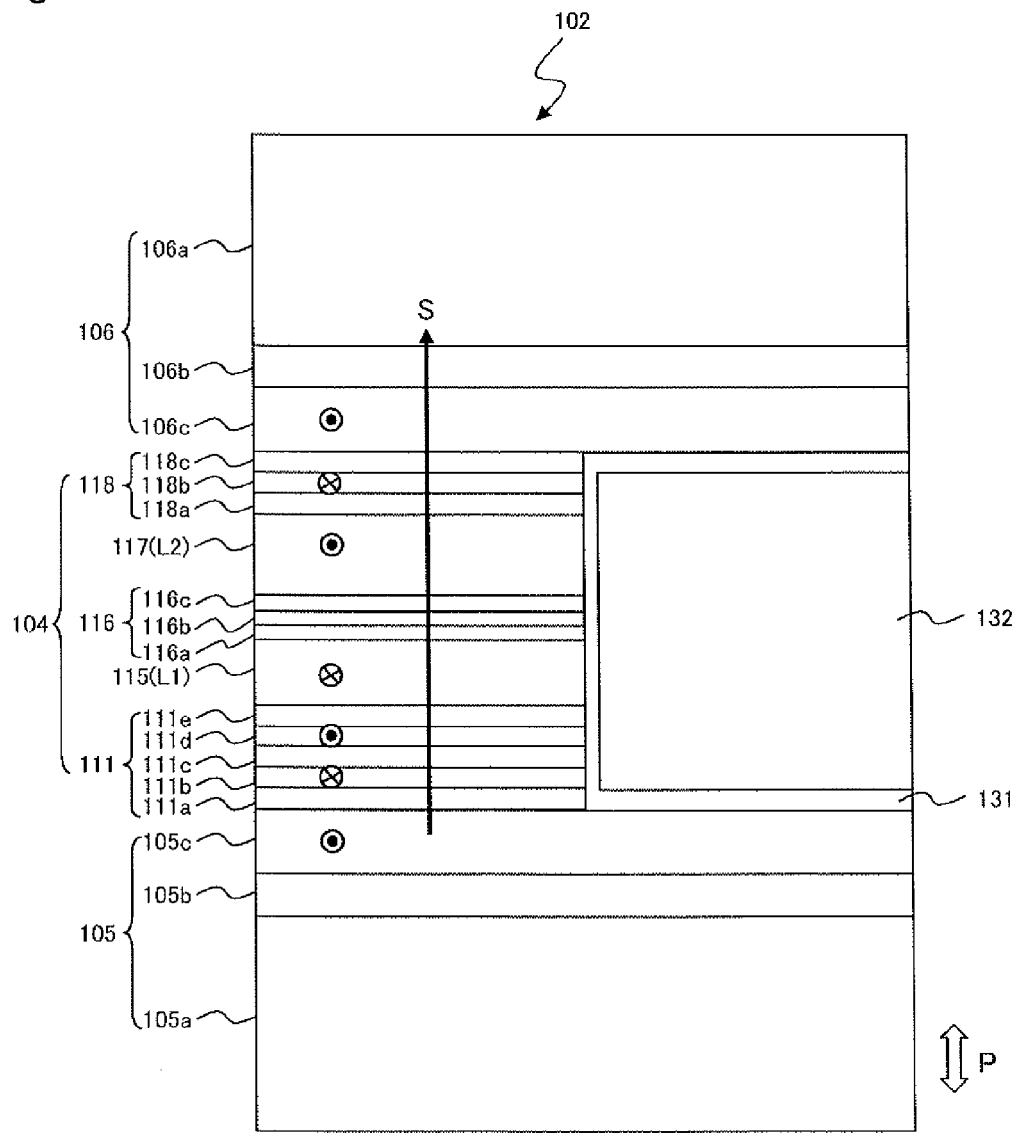
FIG. 3 is a cross-sectional view of an MR element according to a second embodiment, as viewed from the same direction as FIG. 1.

A thin film magnetic head 1 of the present embodiment is the same as the first embodiment illustrated in FIG. 1 with the exception of the configuration of the reproducing head 2. FIG. 3 and Table 2 illustrate a layer configuration of such an MR element. A reproducing head 102 includes an MR element 104 in which a large number of layers are laminated in the same manner as the first embodiment, and upper and lower shield layers 106 and 105 that are disposed in a manner of sandwiching the MR element 104 in the film surface orthogonal direction P (lamination direction). The upper and lower shield layers 106 and 105 are also used as electrodes for a sense current S so that a sense current S flows in the film surface orthogonal direction P of the MR element 104.

In the present embodiment, a first magnetic layer L1 and a second magnetic layer L2 are both magnetization free layers 115 and 117 of which the respective magnetization directions change in response to an external magnetic field. A bias magnetic field application layer 132 is disposed on the backside of the MR element 104 as viewed from the air bearing surface S with an insulating layer 131 therebetween and applies a bias magnetic field in a direction orthogonal to the air bearing surface S to the first and second magnetization free layers 115 and 117 (first and second magnetic layers L1 and L2). A spacer layer 116 is disposed between the first and second magnetization free layers 115 and 117. A first magnetic linkage layer 111 is disposed between the first magnetization free layer 115 and the lower shield layer 105, and a second magnetic linkage layer 118 is disposed between the second magnetization free layer 117 and the upper shield layer 106.

TABLE 2

| Film Configuration | | | Material | Film Thickness (nm) |
|---|---|---|---|---|
| Upper Shield Layer 106 | Second Main Shield Layer 106a | | NiFe | 2000 |
| | Second Anti-Ferromagnetic Layer 106b | | IrMn | 6.0 |
| | Second Exchange Coupling Magnetic Field Application Layer 106c | | CoFe | 1.5 |
| | | | NiFe | 20 |
| MR Element 104 | Second Magnetic Linkage Layer 118 | Exchange Coupling Transmitting Layer 118c | Ru | 0.8 |
| | | Gap Adjustment Layer 118b | CoFe | 1.0 |
| | | Exchange Coupling Transmitting Layer 118a | Ru | 0.8 |
| | Second Magnetization Free Layer 117 (Second Magnetic Layer L2) | | CoFe | 4.0 |
| | Spacer Layer 116 | Nonmagnetic Layer 116c | Zn or Cu | 0.4 |
| | | Main Spacer Layer 116b | GaO$x$ | 0.9 |
| | | Bottom Layer 116a | Partially Oxidized Cu | 0.6 |
| | First Magnetization Free Layer 115 (First Magnetic Layer L1) | | CoFe | 4.0 |
| | First Magnetic Linkage Layer 111 | Exchange Coupling Transmitting Layer 111e | Ru | 0.8 |
| | | Gap Adjustment Layer 111d | CoFe | 1.0 |
| | | Exchange Coupling Transmitting Layer 111c | Ru | 0.8 |
| | | Gap Adjustment Layer 111b | CoFe | 1.0 |
| | | Exchange Coupling Transmitting Layer 111a | Ru | 0.8 |

TABLE 2-continued

| | Film Configuration | Material | Film Thickness (nm) |
|---|---|---|---|
| Lower Shield Layer 105 | First Exchange Coupling Magnetic Field Application Layer 105c | NiFe | 20 |
| | | CoFe | 1.5 |
| | First Anti-Ferromagnetic Layer 105b | IrMn | 6.0 |
| | First Main Shield Layer 105a | NiFe | 2000 |

The lower shield layer 105 includes a first main shield layer 105a, and a first anti-ferromagnetic layer 105b and a first exchange coupling magnetic field application layer 105c laminated above the first main shield layer 105a. The magnetization direction of the first exchange coupling magnetic field application layer 105c is pinned in the track width direction T due to anti-ferromagnetic coupling with the first anti-ferromagnetic layer 105b. Similarly, the upper shield layer 106 includes a second main shield layer 106a, and a second anti-ferromagnetic layer 106b and a second exchange coupling magnetic field application layer 106c laminated below the second main shield layer 106a. The magnetization direction of the second exchange coupling magnetic field application layer 106c is pinned in the track width direction T due to anti-ferromagnetic coupling with the second anti-ferromagnetic layer 106b. The first and second exchange coupling magnetic field application layers 105c and 106c are mutually magnetized in the same direction. In other embodiments, instead of disposing the first and second anti-ferromagnetic layers 105b and 106b and the first and second exchange coupling magnetic field application layers 105c and 106c, it is possible to form the first and second main shield layers 105a and 106a in a long and narrow shape in the track width direction T so as to form a single magnetic domain by using a shape anisotropic effect, so that the magnetization directions of the first and second main shield layers 105a and 106a are oriented in the same direction.

The first magnetic linkage layer 111 has a configuration in which gap adjustment layers 111b and 111d composed of CoFe are alternately and respectively laminated with exchange coupling transmitting layers 111a, 111c and 111e composed of Ru, and the exchange coupling transmitting layers 111a and 111e are positioned at both side end surfaces. The second magnetic linkage layer 118, in the same manner as the first magnetic linkage layer 111, also has a configuration in which a gap adjustment layer 118b composed of CoFe is alternately laminated with exchange coupling transmitting layers 118a and 118c composed of Ru, and the exchange coupling transmitting layers 118a and 118c are positioned at both side end surfaces. A pair of magnetic layers 105c and 111b, a pair of magnetic layers 111b and 111d, and a pair of magnetic layers 111d and 115 that respectively sandwich the exchange coupling transmitting layers 111a, 111c and 111e perform exchange coupling. A pair of magnetic layers 106c and 118b and a pair of magnetic layers 118b and 117 that respectively sandwich the exchange coupling transmitting layers 118a and 118c perform exchange coupling. As illustrated in FIG. 3, the magnetization directions of the layers alternately inverse (no bias magnetic field is applied).

The total film thickness of the MR element 104 can be adjusted to match the shield gap by adjusting the film thicknesses of the gap adjustment layers 111b, 111d and 118b. The smaller the shield gap is, the more beneficial it is to realize high recording density; however, the shield gap may also be determined according to a required film thickness of the bias magnetic field application layer 132. In this case, it is preferred to adjust the total film thicknesses of the MR element 104, i.e., the shield gap, by changing the film thicknesses of the gap adjustment layers 111b, 111d and 118b.

Figure 4:
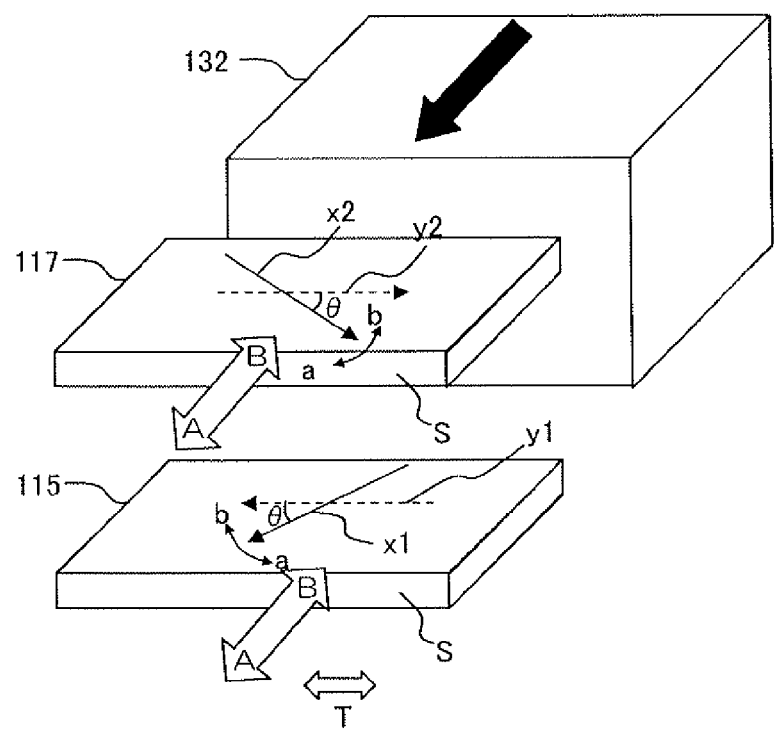
FIG. 4 is a schematic view illustrating a principle of performance of a thin film magnetic head according to the second embodiment.

The above-described MR element 104 performs as described hereinafter. First, a virtual condition will be considered in which there is no bias magnetic field application layer 132. FIG. 4 is a schematic view illustrating the magnetizations of the first and second magnetization free layers 115 and 117. The magnetization directions of the first and second exchange coupling magnetic field application layers 105c and 106c transmit to the first and second magnetization free layers 115 and 117 while reversed by the gap adjustment layers 111b, 111d and 118b with the exchange coupling transmitting layers 111a, 111c, 111e, 118a and 118c therebetween. Accordingly, the first magnetization free layer 115 is magnetized in the track width direction T, or toward an orientation y1 that is anti-parallel to the magnetization direction of the first exchange coupling magnetic field application layer 105c. The second magnetization free layer 117 is magnetized in the track width direction T, or toward an orientation y2 that is the same as the magnetization direction of the second exchange coupling magnetic field application layer 106c.

Next, a condition is considered in which a bias magnetic field is applied. The bias magnetic field rotates the magnetization directions of the first and second magnetization free layers 115 and 117 oriented in the track width direction T toward a direction orthogonal to the air bearing surface S. As illustrated by the solid line arrows x1 and x2 of FIG. 4, the magnetization directions rotate by a predetermined angle θ in mutually opposite directions from the broken line arrows y1 and y2, and ideally are mutually orthogonal. This is the magnetization state of the first and second magnetization free layers 115 and 117 when no external magnetic field is applied.

When an external magnetic field is applied in this state as illustrated by the outline arrows in the drawing, the magnetization directions of the first and second magnetization free layers 115 and 117 rotate in mutually opposite directions according to the orientation of the external magnetic field. When the external magnetic field is applied in the direction A in the drawing, the magnetization directions (solid line arrows x1 and x2) of the first and second magnetization free layers 115 and 117 rotate in the direction (a) in the drawing, and when the external magnetic field is applied in the direction B in the drawing, the magnetization directions of the first and second magnetization free layers 115 and 117 rotate in the direction (b) in the drawing. In this manner, a relative angle formed by the magnetization directions of the first and second magnetization free layers 115 and 117 changes according to the external magnetic field, and the resistance value for the sense current S varies based on the magnetoresistive effect. Utilizing this principle, the MR element 104 can detect the orientation and strength of the external magnetic field.

In this manner, the MR element 104 of the present embodiment includes a pair of magnetization free layers 115 and 117 of which the magnetization directions change according to the external magnetic field, and the spacer layer 116 sandwiched by the magnetization free layers 115 and 117. The MR element 104 differs from the first embodiment with regards to the point that the magnetization directions each of the pair of magnetization free layers 115 and 117 rotate mutually according to the external magnetic field; however, the configuration that is the same as the spacer layer 16 in the first embodiment can be used for the spacer layer 116.

The magnetization directions of the first and second magnetization free layers 115 and 117 can be reversed by adjusting the total number of Ru layers and the gap adjustment layers included in the first and second magnetic linkage layers 111 and 118. For example, when the magnetization directions of the upper shield layer 106 and the lower shield layer 105 are anti-parallel, the magnetization direction of the first magnetization free layer 115 can be reversed by configuring the first magnetic linkage layer 111 with two Ru layers 111a and 111c, and a single gap adjustment layer 111b inserted therebetween as illustrated in Table 3. In the same manner, although not illustrated in the drawing, a similar effect can be obtained by configuring the second magnetic linkage layer 118 with a five layer configuration similar to the first magnetic linkage layer 111 in the configuration indicated in Table 2.

plasma oxidation treatment is performed to the Cu film so as to partially oxidize the previously formed Cu film. As a result, the bottom layer 16a composed of partially oxidized Cu as a primary component can be obtained. The bottom layer 16a can be also obtained by forming a Cu film and then forming copper oxide thereon.

Gallium oxide is used as the target when the main spacer layer 16b is formed.

After that, the previously formed multilayer film is formed in a pillar-shape of the MR element 4, the side surfaces of the MR element 4 are covered with the insulating layers 31, the bias magnetic field application layers 32 are formed on both sides of the MR element 4 in the track width direction T, and the upper shield layer 6 is formed on the MR element 4 and the bias magnetic field application layers 32. In the case of the second embodiment, the bias magnetic field application layer 132 is formed on the backside of the MR element 4 as viewed from the air bearing surface S.

Example

An MR element with the layer configuration illustrated in Table 2 was formed above a substrate composed of $Al_2O_3$—TiC (ALTIC) by using a sputtering device. A nonmagnetic layer 116c was composed of Zn. After a film forming cham-

TABLE 3

| | Film Configuration | | Material | Film Thickness (nm) |
|---|---|---|---|---|
| Upper Shield Layer 106 | Second Main Shield Layer 106a | | NiFe | 2000 |
| | Second Anti-Ferromagnetic Layer 106b | | IrMn | 6.0 |
| | Second Exchange Coupling Magnetic Field Application Layer 106c | | CoFe | 1.5 |
| | | | NiFe | 20 |
| MR Element 104 | Second Magnetic Linkage Layer 118 | Exchange Coupling Transmitting Layer 118c | Ru | 0.8 |
| | | Gap Adjustment Layer 118b | CoFe | 1.0 |
| | | Exchange Coupling Transmitting Layer 118a | Ru | 0.8 |
| | Second Magnetization Free Layer 117 (Second Magnetic Layer L2) | | CoFe | 4.0 |
| | Spacer Layer 116 | Nonmagnetic Layer 116c | Zn or Cu | 0.4 |
| | | Main Spacer Layer 116b | GaOx | 0.9 |
| | | Bottom Layer 116a | Partially Oxidized Cu | 0.6 |
| | First Magnetization Free Layer 115 (First Magnetic Layer L1) | | CoFe | 4.0 |
| | First Magnetic Linkage Layer 111 | Exchange Coupling Transmitting Layer 111c | Ru | 0.8 |
| | | Gap Adjustment Layer 111b | CoFe | 1.0 |
| | | Exchange Coupling Transmitting Layer 111a | Ru | 0.8 |
| Lower Shield Layer 105 | First Exchange Coupling Magnetic Field Application Layer 105c | | NiFe | 20 |
| | | | CoFe | 1.5 |
| | First Anti-Ferromagnetic Layer 105b | | IrMn | 6.0 |
| | First Main Shield Layer 105a | | NiFe | 2000 |

Next, a method for manufacturing the above-described MR element is explained using the MR element of the first embodiment as an example. First, the lower shield layer 5 is formed above the substrate W with an insulating layer therebetween as needed by a plating method. Next, layers configuring the MR element 4 are formed by a sputtering. Specifically, after a film forming chamber containing a target and the substrate W is depressurized to realize a high vacuum atmosphere, inert gas such as argon or the like is introduced into the film forming chamber. When ionized inert gas collides to the target, fine particles are ejected from the target and are sequentially deposited on the lower shield layer 5.

When the bottom layer 16a is formed, a Cu film in a metal state is initially formed on the first magnetic layer L1. Next, a ber pressure was depressurized to a vacuum atmosphere having $10^{-6}$ Pa or less, Ar gas was introduced into the film forming chamber and layers were formed under a sputtering pressure of approximately 0.1 Pa. A gallium oxide layer was formed by a radio frequency (RF) sputtering method, and other films were formed by a direct current (DC) magnetron sputtering method. The bottom layer was formed by forming a Cu film in a metal state and then partially oxidizing the Cu film by an oxygen plasma treatment (power: 30 W, Ar gas flowing rate: 10 mL/min, and oxygen gas flow rate: 20 mL/min). After the layers illustrated in Table 2 were formed, a heating (annealing) treatment was performed at 250° C. for three hours, and the MR element having a junction size of 0.2 μm×0.2 μm was manufactured. When no external magnetic field is applied, the magnetization directions of the first and second magnetization free layers are mutually and orthogonally oriented; however, when an external magnetic field is applied, the magnetization directions freely rotate and the magneto-resistive effect is generated.

In this MR element, the MR ratio was obtained while a degree of oxidation of the Cu film was changed by changing an oxygen plasma treatment duration of the Cu film as illustrated in Table 4. For comparison, samples of first and second comparative examples were manufactured. In the first comparative example, no oxygen plasma treatment was performed and a bottom layer was composed only of Cu. In the second comparative example, Cu was totally oxidized and was in a divalent oxidation state (CuO). The degree of oxidation of Cu was indicated as a ratio of an atomic fraction of oxygen to an atomic fraction of Cu in a bottom layer, and the ratios of samples #1-1 through #1-5 were indicated by estimated values estimated from the oxygen plasma treatment duration. The MR ratio of each sample was normalized based on the MR ratio, which was obtained in the first comparative example, being set to 1.

TABLE 4

| Sample | Oxygen Plasma Treatment Duration (sec) | Ratio of Atomic Fraction of O to Atomic Fraction of Cu in Bottom Layer (Estimated Value) | MR Ratio (Normalized) |
| --- | --- | --- | --- |
| First Comparative Example | 0 | 0.00 | 1.00 |
| #1-1 | 20 | 0.17 | 1.07 |
| #1-2 | 40 | 0.33 | 1.12 |
| #1-3 | 60 | 0.50 | 1.16 |
| #1-4 | 80 | 0.67 | 1.05 |
| #1-5 | 100 | 0.83 | 1.03 |
| Second Comparative Example | 120 | 1.00 | 0.83 |

The MR ratio is improved when even a little of Cu, which is in a metal state in the bottom layer, is oxidized. On the other hand, when Cu in the bottom layer is totally oxidized (the second comparative example), the MR ratio is drastically decreased. Regardless the ratio of oxygen, the bottom layer composed of a mixture of Cu and Cu oxide has a favorable MR ratio than both the bottom layer (the first comparative example) composed only of Cu and the bottom layer (the second comparative example) composed only of Cu oxide. The MR ratio was maximized when the ratio of the atomic fraction of oxygen to the atomic fraction of Cu was 0.5 (in the present example, when the oxygen plasma treatment duration was 60 seconds.)

Next, a phase analysis of the bottom layer was performed on the MR element of sample #1-3 by an electron energy-loss spectroscopy (EELS) method. The EELS is a material analysis method that measures an intensity of scattering by irradiating electron beam with certain incident energy to a target material. The intensity of scattering (Y-axis) is obtained as a function of the energy-loss (X-axis) due to an inelastic scattering.

Figure 5:
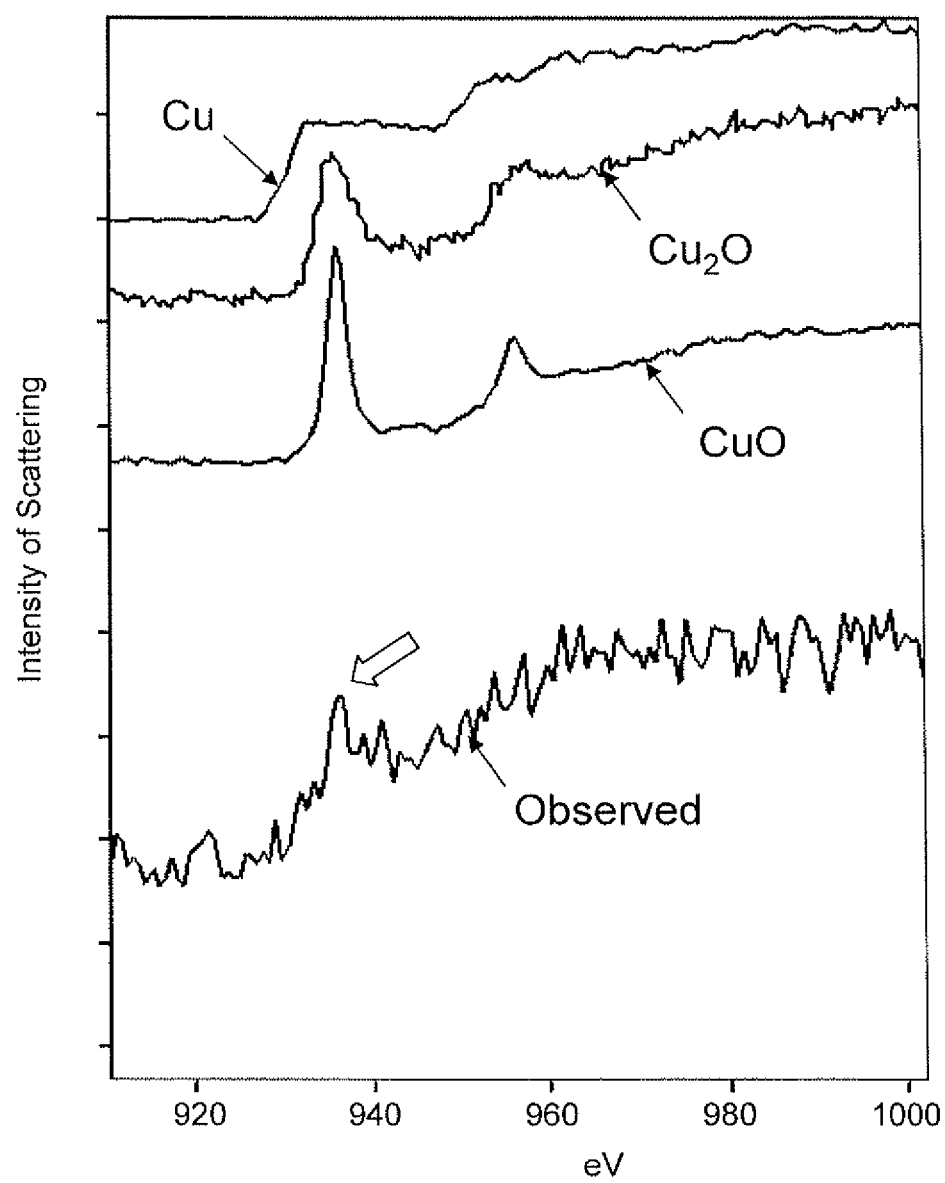
FIG. 5 is a diagram illustrating the result of electron energy-loss spectroscopy (EELS) analysis of a bottom layer.

FIG. 5 illustrates the analysis result by the EELS. The upper three lines in the drawing respectively show spectrum profiles of Cu, $Cu_2O$ and CuO, and the bottom line shows a spectrum profile obtained by the analysis of sample #1-3. When the bottom line is compared with the upper three lines and the bottom line is similar to either one of the upper three lines, it is thought that its analysis target is likely to contain a substance corresponding to the similar line. Characteristic points are the peaks in the vicinity of 940 eV of $Cu_2O$ and CuO and a rise of the intensity of scattering in the vicinity of 930 eV.

The peak in the vicinity of 940 eV, which was also a characteristic point of Cu oxide, was observed in the spectrum profile of sample #1-3 (see the arrow), and it can be understood that Cu oxide was formed in the bottom layer. Similarly, the rise of the intensity of scattering in the vicinity of 930 eV, which was observed in Cu, was observed, and it was understood that Cu was also contained in the bottom layer. As described above, it was confirmed that, by performing the oxygen plasma treatment after the Cu film was formed, diffusion of oxygen occurred and the bottom layer composed of the mixture of Cu and Cu oxide was formed.

Figure 6:
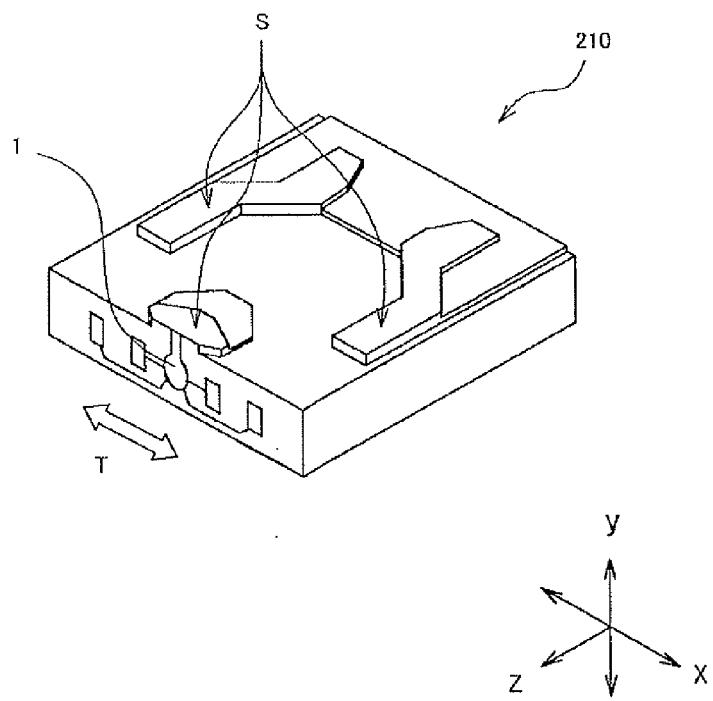
FIG. 6 is a perspective view of a magnetic head slider of the present invention.

Next, the description is given regarding a magnetic head slider on which the thin film magnetic head 1 is mounted. Referring to FIG. 6, a magnetic head slider 210 has a substantially hexahedral shape, and one surface of the six outer surfaces is the air bearing surface S that faces a hard disk. The magnetic head slider 210 is arranged in the hard disk drive device so as to face the hard disk, which is a disk-shaped recording medium M that is rotatably driven. When the hard disk rotates in the z-direction of FIG. 7, air flow passing between the hard disk and the magnetic head slider 210 generates a downward lifting force in the y-direction to the magnetic head slider 210. The magnetic head slider 210 flies above the surface of the hard disk due to the lifting force. In the vicinity of the edge part of the magnetic head slider 210 (edge part in bottom left of FIG. 6) on the air flow exit side, the thin film magnetic head 1 is formed.

Figure 7:
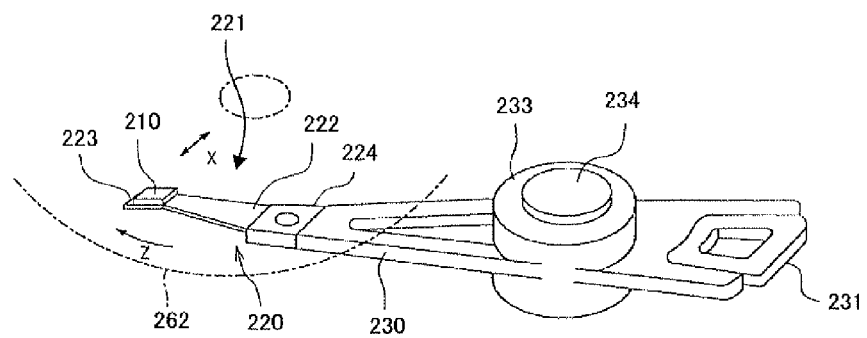
FIG. 7 is a perspective view of a head arm assembly of the present invention.

Referring to FIG. 7, a head gimbal assembly 220 includes the magnetic head slider 210 and a suspension 221 elastically supporting the magnetic head slider 210. The suspension 221 includes a load beam 222, a flexure 223 and a base plate 224. The load beam 222 is formed of stainless steel in a plate spring shape. The flexure 223 is arranged in one edge part of the load beam 222. The base plate 224 is arranged in the other edge part of the load beam 222. The magnetic head slider 210 is joined to the flexure 223 to give the magnetic head slider 210 suitable flexibility. At the part of the flexure 223 to which the magnetic head slider 210 is attached, a gimbal part is disposed to maintain the magnetic head slider 210 in an appropriate orientation.

An assembly in which the head gimbal assembly 220 is mounted to an arm 230 is referred to as a head arm assembly 221. The arm 230 moves the magnetic head slider 210 in a track crossing direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 8:
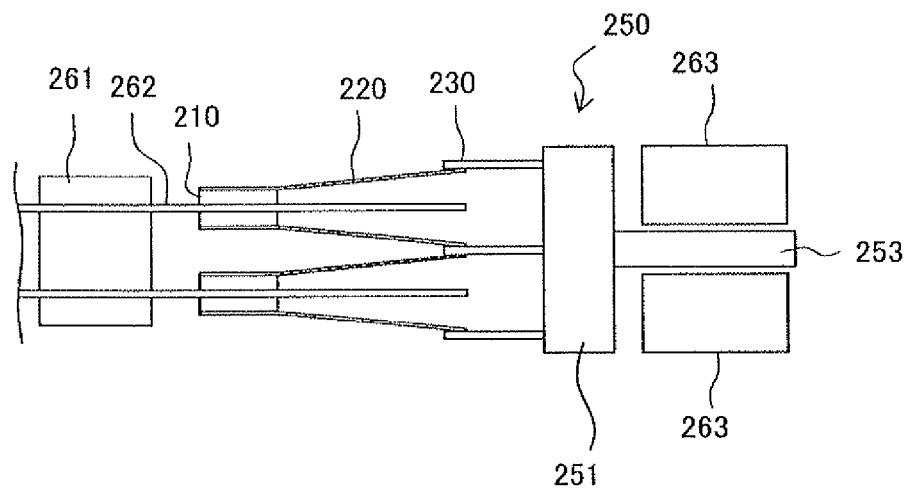
FIG. 8 is a side view of a head stack assembly of the present invention.
Figure 9:
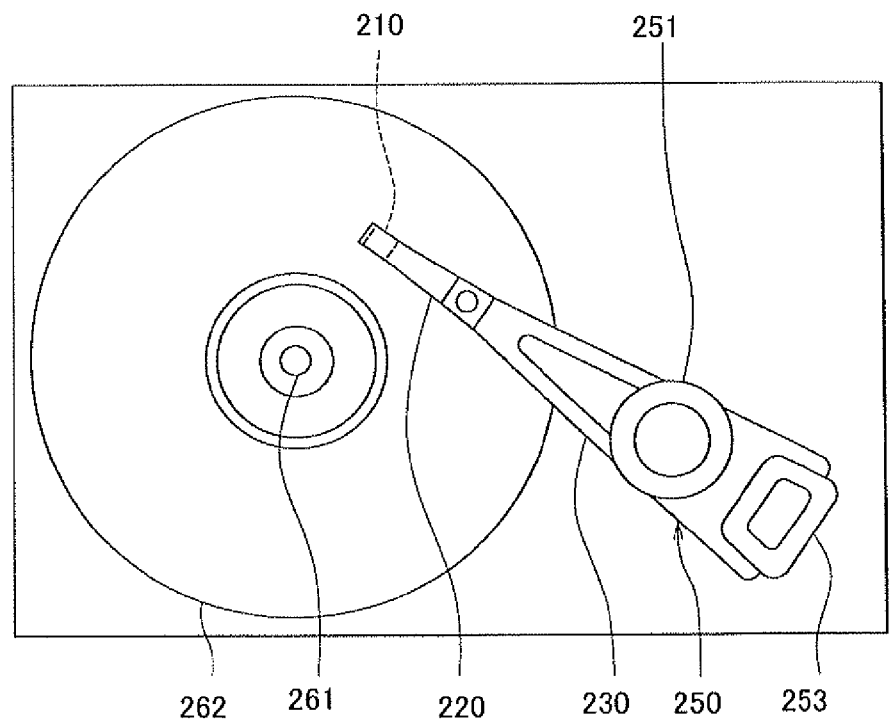
FIG. 9 is a plan view of a hard disk drive device of the present invention.

Next, referring to FIGS. 8 and 9, the description is given with regard to a head stack assembly in which the above-described magnetic head slider is integrated, and the hard disk drive device. The head stack assembly is an assembly in which the head gimbal assembly 220 is attached to each arm of a carriage including a plurality of the arms. FIG. 8 is a side view of the head stack assembly, and FIG. 9 is a plan view of the hard disk drive device. The head stack assembly 250 includes a carriage 251 including a plurality of arms 230. On each of the arms 230, the head gimbal assembly 220 is attached such that the head gimbal assemblies 220 align mutually at an interval in the vertical direction. On the side of the carriage 251, which is the opposite side to the arm 230, a coil 253 is mounted to be a part of the voice coil motor. The voice coil motor includes permanent magnets 263 arranged so as to sandwich the coil 253 and to face each other.

Referring to FIG. 8, the head stack assembly 250 is integrated in the hard disk drive device. The hard disk drive device includes multiple hard disks 262 attached to a spindle motor 261. For each of the hard disks 262, two magnetic head sliders 210 are arranged in a manner of sandwiching the hard disk 262 and facing each other. The head stack assembly 250 except for the magnetic head slider 210 and the actuator position the magnetic head slider 210 with respect to the hard disk 262 in correspondence with a positioning device as well as supports the magnetic head slider 210. The magnetic head slider 210 is moved in the track crossing direction of the hard disk 262 by the actuator, and is positioned with respect to the hard disk 262. The thin film magnetic head 1 included in the magnetic head slider 210 records information to the hard disk 262 with the recording head 3, and reproduces information recorded on the hard disk 262 with the reproducing heads 2 and 102.

While preferred embodiments of the present invention have been shown and described in detail, and it is to be understood that variety of changes and modifications may be made without departing from the spirit of scope of the following claims or its scope.

What claimed is:

1. A magneto-resistive effect (MR) element, comprising:
   first and second magnetic layers where a relative angle formed by magnetization directions changes in response to an external magnetic field; and
   a spacer layer positioned between the first magnetic layer and the second magnetic layer, wherein
   the first magnetic layer is positioned closer to a substrate above which the MR element is formed than the second magnetic layer, wherein
   the spacer layer includes:
      a main spacer layer that is composed of gallium oxide as a primary component; and
      a bottom layer that is positioned between the main spacer layer and the first magnetic layer and that is composed of partially oxidized copper as a primary component.

2. The MR element according to claim 1, wherein
   in the bottom layer, a ratio of atomic fraction of oxidized copper becomes smaller as it is closer to the first magnetic layer.

3. The MR element according to claim 1, wherein
   the oxidized copper contained in the bottom layer contains $Cu_2O$.

4. A magnetic head, comprising:
   the MR element according to claim 1.

5. The magnetic head according to claim 4, wherein
   either one of the first magnetic layer and the second magnetic layer is a magnetization free layer of which the magnetization direction changes in response to the external magnetic field, and the other is a magnetization pinned layer of which the magnetization direction is pinned,
   the magnetic head, further comprising:
   a pair of bias magnetic field application layers that is disposed on both sides of the MR element in a track width direction and that applies a bias magnetic field in the track width direction to the magnetization free layer.

6. The magnetic head according to claim 4, wherein
   both the first magnetic layer and the second magnetic layer are magnetization free layers of which the magnetization directions change in response to the external magnetic field, further comprising:
   a bias magnetic field application layer that is disposed on a backside of the MR element as seen from an air bearing surface and that applies a bias magnetic field in a direction orthogonal to the air bearing surface to the first and second magnetic layers.

7. A magnetic head slider, comprising:
   the magnetic head according to claim 4.

8. A head gimbal assembly, comprising:
   the magnetic head according to claim 4.

9. A hard disk drive device, comprising:
   the magnetic head according to claim 4.

* * * * *